3,377,234
DE-INKING PRINTED WASTE CELLULOSIC STOCK UTILIZING AN ADMIXTURE OF ALKYL SULFATES AND ALKYL ARYL SULFONATES

Robert H. Illingworth, Madison, N.J., assignor to Garden State Paper Co., Inc., Garfield, N.J., a corporation of Delaware
No Drawing. Filed Sept. 5, 1963, Ser. No. 306,681
13 Claims. (Cl. 162—5)

This invention relates to improvements in de-inking printed waste cellulosic stock.

It is an object of the present invention to provide methods and agents for de-inking printed cellulosic material to produce a pulp that can be handled on conventional paper making machines to produce newsprint, magazine or book stock.

The de-inking agent of the present invention comprises an admixture of alkyl sufates, alkyl aryl sulfonates and sodium polyphosphate.

Any alkyl sulfate containing up to 4 to 30 carbon atoms in the alkyl chain, such as lauryl sulfate, may be used.

Alkyl aryl sulfonates, such as alkyl benzene sulfonate, having up to 4 to 30 carbon atoms in the alkyl substituent may be used. Typical of such materials is sodium dodecyl benzene sulfonate.

A suitable formulation for the active de-inking agent is as follows:

EXAMPLE 1

| | Parts by weight |
|---|---|
| Sodium lauryl sulfate | 20–30 |
| Sodium dodecyl benzene sulfonate | 1–4 |
| Sodium polyphosphate ($NA_5P_3O_{10}$) | 55–70 |

The temperature of the de-inking solution may vary anywhere from room temperature, e.g., 40° to 70° F., up to about 200° F.

Best results are achieved with the de-inking solutions described herein when they are alkaline in pH and it therefore is desirable that an alkali be included therein. Although any suitable alkali or alkaline earth metal hydroxide or salt may be employed, the alkali metal hydroxides and salts, such as sodium hydroxide, potassium hydroxide, soda ash and the like are preferred. Enough of the alkali should be added to maintain the pH of the de-inking solution between about 7.0 and 10, or even higher, and preferably at least about 7.1.

In preparing the de-inking solution, water is charged to the reactor or pulper and about 0.3 to 3 percent, based on the weight of the paper, of the combined de-inking agent described hereinabove added. The de-inking agent is preferably added to the water prior to the addition of the wastepaper or junk.

To the resulting solution is added the printed paper, scrap or junk. The printed cellulosic charge may, if desired, be shredded by appropriate means prior to treatment. This, however, is not necessary, and the waste material may be added to the treating solution without shredding or without any subdivision in size whatsoever. It is one of the advantages of this invention that costly shredding or pulping techniques prior to de-inking need not be employed. Thus, the waste material to be de-inked is preferably added to the treating solution in its naturally dry condition, i.e., without being subjected to moisture or water other than that which is normally present in the atmosphere. Although de-inking will occur if the waste material is first slurried or pulped in water, in general it has been found that the results achieved are inferior to those obtained when the waste material is added to the treating solution in its naturally dry condition, i.e., in equilibrium with its natural atmospheric environment. Although not wanting to be restricted to this interpretation, it appears that wetting the waste material with water prior to subjecting it to the chemical treatment described herein has a tendency to set the junk and make it more difficult to remove from the cellulosic fibers. The amount of the scrap or junk added to the treating solution should be controlled. In general, the percent of cellulosic material by weight of the aqueous de-inking solution should be below 10 percent and preferably below 6.0 percent, or between about 4.0 and 6.0 percent. Good results are obtained when the de-inking solution contains about 5 to 5.5 percent by weight of paper and this value appears to be optimum. The scrap is retained in the treating solution until substantial defiberization and separation of the ink takes place.

Following treatment, the defibered material is dropped to a chest or other suitable reservoir, after which it is diluted with water to a solid content of between about 0.5 and 1.5 percent, preferably about 1.0 percent, based upon the solution weight.

Following dilution, the pulp is separated from the solution and washed and thickened by well known methods. The resulting pulp is then acidified to a pH of between about 4 and 6.5, preferably between about 4.5 and 5.5, thickened and then formed into a web.

This acidification step has been found to significantly increase the brightness of the paper produced from the recovered pulp, and also avoids the necessity of bleaching the pulp.

The recovered stock may be blended with fresh virgin sulfate or sulfite stock, or with additional recovered stock to make cellulosic articles, such as newspaper, and so forth.

The nature of the de-inking process will be made more clear by reference to the following example.

EXAMPLE 2

An aqueous solution containing the following proportions of ingredients is prepared:

| | Pounds |
|---|---|
| Detergent of Example 1 | 25–35 |
| Trisodium phosphate | 10–20 |
| Borax | 12–20 |
| Caustic soda | 0.5–3 |
| Soda ash | 0.5–3 |
| Tetrasodium pyrophosphate | 0.5–1 |
| Carboxymethyl cellulose | 0.5–0.2 |

The quantities specified above are based on one ton of dry paper. The solution is charged to or made up in a hydrapulper. Waste printed paper is added to the solution to provide a slurry comprising 6 percent paper, and 94 percent water.

Pulping is continued until the ink is separated from the fiber.

After a suitable period of time in the pulper, the mixture is dropped to a storage chest which is preferably equipped with a suitable agitator. If desired, water may be charged to the chest to reduce the solid content of the mixture therein. The mixture from the chest is then diluted to the solid content indicated hereinabove, and washed and thickened in a well known manner. The pulp may be thickened to about a 5 percent solid consistency, or between about a 3 to 8 percent solid consistency in this manner. Co-current or counter-current washing, alone or in combination, may be used. The resulting pulp is then acidified to the pH indicated hereinabove by addition thereto of a dilute solution of a suitable acid, as for example, alum, sulfuric acid, $SO_2$, and so forth. The resulting pulp may be finally thickened and formed into a web. The number of thickening and washing steps preceding the acidification step, it should be understood, is not critical, and the number of such treatments will be governed largely by the type of equipment employed. Also, if desired, the pulp may be bleached, using a suitable bleaching agent, following acidification. Ordinarily, however, bleaching is not required. When only acidification is used, the pulp need not be, and preferably is not, washed following acidification.

Although in the examples a batch, or more properly, a semi-batch process is indicated, it should be understood that the de-inking may be carried out using a continuous process, as will be obvious to those skilled in the art.

The water used in the process may be soft and iron-free.

The invention in its broader aspects is not limited to the specific compositions, steps and methods described, but departures may be made therefrom within the scope of the accompanying claims without departing from the principles of the invention and without sacrificing its chief advantages.

What is claimed is:

1. A process for de-inking waste printed paper which comprises pulping waste printed paper utilizing as the active de-inking agent, an alkyl sulfate having 4 to 30 carbon atoms in the alkyl chain, and an alkyl aryl sulfonate having 4 to 30 carbon atoms in the alkyl substituent.

2. The method of claim 1 wherein the alkyl sulfate is lauryl sulfate, and the alkyl aryl sulfonate is dodecyl benzene sulfonate.

3. A process for de-inking waste printed paper which comprises pulping printed cellulosic material in an aqueous solution comprising, as the active de-inking agent, an admixture of 20 to 30 weight parts of sodium lauryl sulfate and 1 to 4 weight parts of sodium dodecyl benzene sulfonate, the amount of printed cellulosic material being below about 10 percent by weight of the aqueous solution, and the amount of the active de-inking agent being between about 0.3 and 3 percent, based upon the weight of the cellulosic material, continuing the pulping until the ink separates from the fibers, and recovering the resulting pulp from the aqueous solution.

4. The method of claim 3 wherein the aqueous solution has an alkaline pH.

5. The method of claim 3 wherein the pH of the pulp is reduced to between about 4.0 and 6.50 following washing.

6. The method of claim 3 wherein the amount of printed paper charged to the pulper is between about 4.0 and 6.0 percent by weight of the solution.

7. The method of claim 3 wherein the aqueous pulping solution includes an alkali and carboxymethyl cellulose.

8. A process for de-inking waste printed paper which consists essentially of pulping printed cellulosic material in an aqueous alkaline solution comprising as the active de-inking agent in admixture 20–30 parts by weight of an alkali metal alkyl sulfate having 4–30 carbon atoms in the alkyl chain, and 1–4 parts by weight of an alkali metal alkyl aryl sulfonate having 4–30 carbon atoms in the alkyl substituent, the amount of cellulosic material being below about 10% by weight of the aqueous solution, the amount of the de-inking agent being about 0.3 and 3% based upon the weight of the cellulosic material, continuing the pulping until the ink separates from the fibres, separating the pulp from the solution and recovering the resulting de-inked pulp.

9. A process for de-inking waste printed paper which consists essentially of pulping printed cellulosic material in an aqueous solution comprising as the active de-inking agent in admixture 20–30 parts by weight of sodium lauryl sulfate and 1–4 parts by weight of sodium dodecyl benzene sulfonate.

10. A process for de-inking waste printed paper which comprises pulping printed cellulosic material in an aqueous alkaline solution comprising as the active de-inking agent in admixture 20–30 parts by weight of an alkali metal alkyl sulfate having 4–30 carbon atoms in the alkyl chain, 1–4 parts by weight of an alkali metal alkyl aryl sulfonate having 4–30 carbon atoms in the alkyl substituent, and 55–70 parts by weight of sodium polyphosphate, the amount of cellulosic material being below about 10% by weight of the aqueous solution and the amount of the active de-inking agent being between about 0.3 and 3% based on the weight of the cellulosic material, continuing the pulping until the ink separates from the fibers, separating the aqueous solution from the pulp and recovering the resulting de-inked pulp.

11. A process for de-inking waste printed paper which comprises pulping printed cellulosic material in an aqueous alkaline solution comprising as the active de-inking agent in admixture 20–30 parts by weight of sodium lauryl sulfate and 1–4 parts by weight of sodium dodecyl benzene sulfonate.

12. A process for de-inking waste printed paper which comprises pulping printed cellulosic material in an aqueous alkaline solution comprising as the active de-inking agent the admixture:

| | Pounds |
|---|---|
| Sodium lauryl sulfate | |
| Sodium dodecyl benzene | 25–35 |
| Sodium polyphosphate | |
| Trisodium phosphate | 10–20 |
| Borax | 12–20 |
| Caustic soda | 0.5–3 |
| Soda ash | 0.5–1 |
| Tetrasodium pyrophosphate | 0.5–1 |
| Carboxymethyl cellulose | 0.5–0.2 | the amount of cellulosic material being below about 10% by weight of the aqueous solution, continuing the pulping until the ink separates from the fibers separating the resulting pulp from the aqueous solution and recovering the de-inked pulp.

13. A process for de-inking waste printed paper which comprises pulping printed cellulosic material in an aqueous alkaline solution comprising as the active de-inking agent the admixture:

| | Pounds |
|---|---|
| Sodium lauryl sulfate | |
| Sodium dodecyl benzene sulfonate | 25–35 |
| Sodium polyphosphate | |
| Trisodium phosphate | 10–20 |
| Borax | 12–20 |
| Caustic soda | 0.5–3 |
| Soda ash | 0.5–1 |
| Tetrasodium pyrophosphate | 0.5–1 |
| Carboxymethyl cellulose | 0.5–0.2 | and recovering a de-inked pulp.

References Cited

UNITED STATES PATENTS

| 1,572,479 | 2/1926 | Hammond | 162—5 |
| 2,072,487 | 3/1937 | Snyder | 162—5 |
| 2,116,511 | 5/1938 | Earle | 162—5 |
| 2,743,178 | 4/1956 | Krodel | 162—5 |
| 3,056,713 | 10/1962 | Gartner | 162—5 |

OTHER REFERENCES

Surface-Active Agents from Ind. and Eng. Chem., vol. 33, No. 1, pp. 16 to 22, January 1941.

West Deinking of Paper, pp. 5 to 11, pub. by Institute of Paper Chemistry, Appleton, Wis., April 1943.

Losee, Precipitation and Saponification, Canadian Chemistry and Process Industries, p. 90, September 1946.

DONALL H. SYLVESTER, *Primary Examiner.*

HOWARD R. CAINE, *Examiner.*